(12) United States Patent
Perlman (10) Patent No.: US 8,150,038 B2
(45) Date of Patent: Apr. 3, 2012

(54) REVOCATION OF A SYSTEM ADMINISTRATOR IN AN ENCRYPTED FILE SYSTEM

(75) Inventor: Radia Perlman, Sammamish, WA (US)

(73) Assignee: Oracle America, Inc., Redwood City, CA (US)

( * ) Notice: Subject to any disclaimer, the term of this patent is extended or adjusted under 35 U.S.C. 154(b) by 1157 days.

(21) Appl. No.: 11/933,701

(22) Filed: Nov. 1, 2007

(65) Prior Publication Data

US 2009/0116649 A1   May 7, 2009

(51) Int. Cl.
G06F 21/00   (2006.01)

(52) U.S. Cl. .............. 380/277; 380/45; 380/259; 726/2; 709/216; 713/168; 713/171

(58) Field of Classification Search ........... 380/250–277
See application file for complete search history.

(56) References Cited

U.S. PATENT DOCUMENTS

| | | | |
|---|---|---|---|
| 5,261,002 A | 11/1993 | Perlman et al. |
| 5,351,295 A | 9/1994 | Perlman et al. |
| 5,475,763 A | 12/1995 | Kaufman et al. |
| 5,483,598 A | 1/1996 | Kaufman et al. |
| 5,892,828 A | 4/1999 | Perlman |
| 5,901,227 A | 5/1999 | Perlman |
| 6,173,400 B1 | 1/2001 | Perlman et al. |
| 6,230,266 B1 | 5/2001 | Perlman et al. |
| 6,263,434 B1 | 7/2001 | Hanna et al. |
| 6,363,480 B1 | 3/2002 | Perlman |
| 6,389,532 B1 | 5/2002 | Gupta et al. |
| 6,510,523 B1 | 1/2003 | Perlman et al. |
| 6,546,486 B1 | 4/2003 | Perlman et al. |
| 6,560,705 B1 | 5/2003 | Perlman et al. |
| 6,636,838 B1 | 10/2003 | Perlman et al. |
| 6,804,779 B1 | 10/2004 | Carroni et al. |
| 6,883,100 B1 | 4/2005 | Elley et al. |
| 6,912,656 B1 | 6/2005 | Perlman et al. |
| 6,975,729 B1 | 12/2005 | Perlman |
| 6,996,712 B1 | 2/2006 | Perlman et al. |
| 7,016,499 B2 | 3/2006 | Perlman |
| 7,054,905 B1 | 5/2006 | Hanna et al. |
| 7,058,798 B1 | 6/2006 | Elley et al. |
| 7,178,021 B1 | 2/2007 | Hanna et al. |
| 7,213,262 B1 | 5/2007 | Elley et al. |

(Continued)

OTHER PUBLICATIONS

Ravi et al., "Securing Pocket Hard Drives", Pervasive Computing, IEEE, Oct. 15, 2007, vol. 6 Issue:4, on pp. 18-23.*

(Continued)

*Primary Examiner* — Taghi Arani
*Assistant Examiner* — Morshed Mehedi
(74) *Attorney, Agent, or Firm* — Brooks Kushman P.C.

(57) ABSTRACT

A method of securely storing electronic information includes a step in which target electronically stored information is encrypted with a first encryption key and then partitioned into a first set of encrypted ESI partitions a subset of which is able to reconstruct the unpartitioned encrypted ESI. This first set of encrypted ESI partitions is then encrypted with a first set of user encryption keys to form a first set of user-associated encrypted ESI partitions that are made available to a first set of users. When access to the target electronically stored information is changed, the target electronically stored information is accessed and then re-encrypted with a second encryption key to form a second encrypted ESI. This second encrypted ESI is then partitioned and distributed to a second set of users.

13 Claims, 6 Drawing Sheets

U.S. PATENT DOCUMENTS

| | | | |
|---|---|---|---|
| 7,370,166 B1 * | 5/2008 | Ramesh et al. | 711/163 |
| 7,778,417 B2 * | 8/2010 | Rutkowski et al. | 380/201 |
| 7,792,300 B1 * | 9/2010 | Caronni | 380/277 |
| 8,006,280 B1 * | 8/2011 | Hildebrand et al. | 726/1 |
| 2002/0136410 A1 * | 9/2002 | Hanna | 380/277 |
| 2002/0191797 A1 | 12/2002 | Perlman | |
| 2003/0115154 A1 | 6/2003 | Anderson et al. | |
| 2005/0066174 A1 | 3/2005 | Perlman | |
| 2005/0066175 A1 | 3/2005 | Perlman | |
| 2005/0108534 A1 * | 5/2005 | Bajikar et al. | 713/172 |
| 2007/0245410 A1 | 10/2007 | Perlman et al. | |
| 2008/0130890 A1 * | 6/2008 | Rigler | 380/259 |

OTHER PUBLICATIONS

Shamir, Adi, "How to Share a Secret," Mass. Inst. of Tech., v. 22, n. 11, Nov. 1979, pp. 612-613.

Di Crescenzo, Giovanni et al., "How to Forget a Secret (Extended abstract)," 11 pgs., STACS' 99 1999, 16th annual conf. on Theoretical aspects of computer science.

Perlman, Radia, "The Ephemerizer: Making Data Disappear," Sun microsystems, Feb. 2005, pp. 1-17 (plus 3 pgs of cover sheet).

* cited by examiner

REVOCATION OF A SYSTEM ADMINISTRATOR IN AN ENCRYPTED FILE SYSTEM

BACKGROUND OF THE INVENTION

1. Field of the Invention

In at least one aspect, the present invention relates to methods for protecting data in computer networks, and in particular to methods for revoking a system administrator's access to an encrypted file system.

2. Background Art

As businesses become more dependent on the electronic storage of information, security and preservation of such electronically stored information is of paramount importance. Methodologies that are useful in limiting access to electronically stored information include encryption, biometrics, access devices, and the like. While encryption protects encrypted data from being accessed by someone not in possession of the decryption key, the greater the number of individuals having access to the decryption key, the greater the potential is for such a key to fall into the wrong hands.

Certain situations exist that require key management among a plurality of administrators. To better facilitate key management for such situations, methodologies have been described that require a quorum of system administrators to access secured electronically stored information. For example, in Adi Shamir, *How to Share a Secret*, Communications of the ACM, November, 1979, volume 22, number 11, a method is discussed for dividing data into a number of portions (n) such that the data is reconstructable from a defined number of portions (k), even if k is less than n. In accordance with this strategy, complete knowledge of k−1 pieces reveals absolutely no information about the encrypted data. Such a scheme enables a cryptographic system that can limit access to information, and yet recover data even when several portions are lost or stolen.

Although such methods are useful in limiting access to sensitive information, there are still a number of concerns with the known prior art technologies. For example, electronic information is typically highly replicated thereby making it nearly impossible to erase all copies of the information. Moreover, terminated or revoked system administrators cannot be relied on to return smart cards or to act in an ethical manner. A quorum of such users may inappropriately access secured information.

Accordingly, for at least these reasons new methods for securing critical electronically stored information are desirable.

SUMMARY OF THE INVENTION

The present invention solves one or more problems of the prior art by providing in at least one aspect a method of securely storing electronic information. The method of this embodiment comprises a step in which target electronically stored information ("ESI") is encrypted with a first encryption key to form a first encrypted ESI. The first encrypted ESI is partitioned into a first set of encrypted ESI partitions. Advantageously, a predetermined number of the encrypted ESI partitions are able to reconstruct the first encrypted ESI. The first set of encrypted ESI partitions are encrypted with a first set of user encryption keys to form a first set of user-associated encrypted ESI partitions each of which has an associated user encryption key. The first set of user-associated encrypted ESI partitions are made available to a first set of users. Each user is able to decrypt at least one of the encrypted ESI partitions. When access to the target electronically stored information is changed such as when a user's access privileges are revoked, the target electronically stored information is accessed as an initial step in changing access privileges. The target ESI is re-encrypted with a second encryption key to form a second encrypted ESI which is partitioned into a second set of encrypted ESI partitions. Again, the second set of encrypted ESI partitions are such that a predetermined number of encrypted ESI partitions from the second set are able to reconstruct the second encrypted ESI. The second set of encrypted ESI partitions are encrypted with a second set of user encryption keys to form a second set of user-associated encrypted ESI partitions having an associated user encryption key. The second set of user-associated encrypted ESI partitions are then made available to a second set of users. Finally, the first encryption key is forgotten thereby rendering access to any back copies of the originally encrypted ESI useless.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "ephmerizer" as used herein means a service that manages encryption and/or decryption keys. Characteristically, such services are able to efficiently destroy such keys when necessary. For example, an ephmerizer may accomplish this task by not making or limiting backup copies of the relevant keys or by maintaining sufficient control over copies of the keys. In each of these examples, sufficient control is maintained so that all copies of the keys may be reliably destroyed (i.e., forgotten).

The term "key" as used herein means a piece of information that controls the access to other information encrypted by an encryption algorithm. In some variations, the same key may be used to encrypt and decrypt the same information. In other variations, public-key cryptography is employed using a pair of cryptographic keys—a public key and a private key.

In an embodiment of the present invention, a method of storing electronic information is provided. FIGS. 1A, 1B, 1C, and 1D provide a schematic illustration of the method of this embodiment. One or more steps of the present embodiment are advantageously encoded on a computer readable medium and executed by a computer processor. Examples of such media include, but are not limited to, RAM, hard drives, magnetic tape drives, CD-ROM, DVD, optical drives, and the like. In step a) of the present embodiment, target electronically stored information ("ESI") 10 is encrypted with first encryption key 12 to form first encrypted ESI 14. In a particularly useful application of the present embodiment, target electronically stored information 10 is an access code for an encrypted file system. In a refinement, decryption key 16, which may be different than first encryption key 12, is used to retrieve electronically stored information 10. Alternatively, first encryption key 12 is able to both encrypt and decrypt the electronically stored information. In a further refinement, first encryption key 12 and decryption key 16 are a public key pair referred to herein as Pi. In a variation of the present embodiment, first encryption key 12 and/or decryption key 16 are managed by one or more ephemerizers as set forth below.

First encrypted ESI 14 is then partitioned into first set 18 of encrypted ESI partitions $20^i$ in step b). As used herein, superscript i associated with an item number represents the existence of multiple instances of an item. Encrypted ESI partitions $20^i$ are characterized in that a predetermined number of the encrypted ESI partitions are able to reconstruct first encrypted ESI 14. Such a predetermined number is sometimes referred to as a quorum. Strategies on using such partitions are provided in Adi Shamir, *How to Share a Secret*, Communications of the ACM, November, 1979, volume 22, number 11, the entire disclosure of which is hereby incorporated by reference. In one refinement, this predetermined number of encrypted partitions capable of reconstructing first encrypted ESI 14 is equal to the total number of partitions formed in step b). In another refinement, this predetermined number of encrypted partitions capable of reconstructing first encrypted ESI 14 is less than the total number of partitions formed in step b).

Still referring to FIG. 1, first set 18 of encrypted ESI partitions $20^i$ are encrypted is step c) with first set 22 of user encryption keys $24^i$ to form a first set 28 of user-associated encrypted ESI partitions $30^i$. Each of user-associated encrypted ESI partitions $30^i$ has an associated user encryption key from set 22. In step d), first set 28 of user-associated encrypted ESI partitions $30^i$ are made available to first set of users $32^i$. Sometimes, user-associated encrypted ESI partitions $30^i$ are referred to herein as a quorum share. In a variation of this embodiment, first set of users $32^i$ are system administrators. Each user knows a decryption key $34^i$ for at least one encrypted ESI partition of the first set 28 of user-associated encrypted ESI partitions $30^i$.

Still referring to FIGS. 1A, 1B, 1C, and 1D, the present embodiment advantageously allows the set of users having access to the ESI to be changed, with the privileges of some users being revoked if desired. In set e), target electronically stored information 10 is accessed by quorum of users Q1 when access to electronically stored information 10 is to be altered. Target electronically stored information 10 is then re-encrypted in step f) with second encryption key 38 to form second encrypted ESI 42. As set forth above, in a refinement, decryption key 40, which may be different than second encryption key 38, is used to retrieve electronically stored information 10. Alternatively, second encryption key 38 is able to both encrypt and decrypt the electronically stored information. In a further refinement, second encryption key 38 and decryption key 40 are a public key pair referred to herein as Pi+1. In a variation of the present embodiment, second encryption key 38 and/or decryption key 40 are managed by one or more ephemerizers as set forth below.

In step g), second encrypted ESI 42 is partitioned into second set 44 of encrypted ESI partitions $46^i$. In an analogous manner as set forth above, second set 44 of encrypted ESI partitions $46^i$ is such that a predetermined number of encrypted ESI partitions from second set 44 are able to reconstruct second encrypted ESI 42.

Also as set forth above, second set 44 of encrypted ESI partitions $46^i$ are encrypted with second set 52 of user encryption keys $54^i$ to form second set 58 of user-associated encrypted ESI partitions $60^i$. Each encrypted ESI partition of second set 44 of encrypted ESI partitions $46^i$ has an associated user encryption key from second set 52. Some or all user encryption keys $54^i$ may be the same or different than first set 22 of user encryption keys $24^i$. In step i), second set 58 of user-associated encrypted ESI partitions $60^i$ are made available to second set of users $62^i$. Each user $62^i$ knows a decryption key $64^i$ for an encrypted ESI partition of second set 58 of user-associated encrypted ESI partitions $60^i$. In a variation of the present embodiment, first encryption key 12 is forgotten after step e) thereby perfecting the security of electronic stored information 10.

In a variation of the present invention, first encryption key 12 and second encryption key 38 are managed by an ephemerizer. In a refinement, there is a quorum of ephemerizers that can assist in the retrieval of the first and/or second encryption key without directly maintaining the first and/or second encryption key. U.S. Patent No. 20050066175 provides strategies for utilizing ephemerizers for encryption and decryption. The entire disclosure of this application is hereby incorporated by reference. For example, first encrypted ESI 14 is formed from target electronically stored information 10 via first encryption key 12. In a variation, first encryption key 12 is the private portion of a custom public key pair Pi that includes first encryption key 12 and decryption key 16 that is maintained by an ephemerizer. A "custom key" is one that is not shared across clients, unlike a timed expiration key which may be shared across clients. The ephemerizer makes available the public portion of public key pair Pi to a system utilizing the methods of the invention. This custom key is changed whenever access to target electronically stored information 10 is changed (i.e., a system administrator is revoked). In this context, changing means that a new public key pair Pi+1 is generated with the ephemerizer forgetting the private portion of Pi. However, for a time after Pi+1 is generated, both Pi and Pi+1 are remembered by the ephemerizer, to give a chance for data encrypted with Pi+1 to be stored and replicated before Pi is forgotten. Once the encrypted shares are stored, and backed up, presumably with multiple copies in multiple geographic locations, then the ephemerizer is told to forget the private key for Pi.

Figure 2:
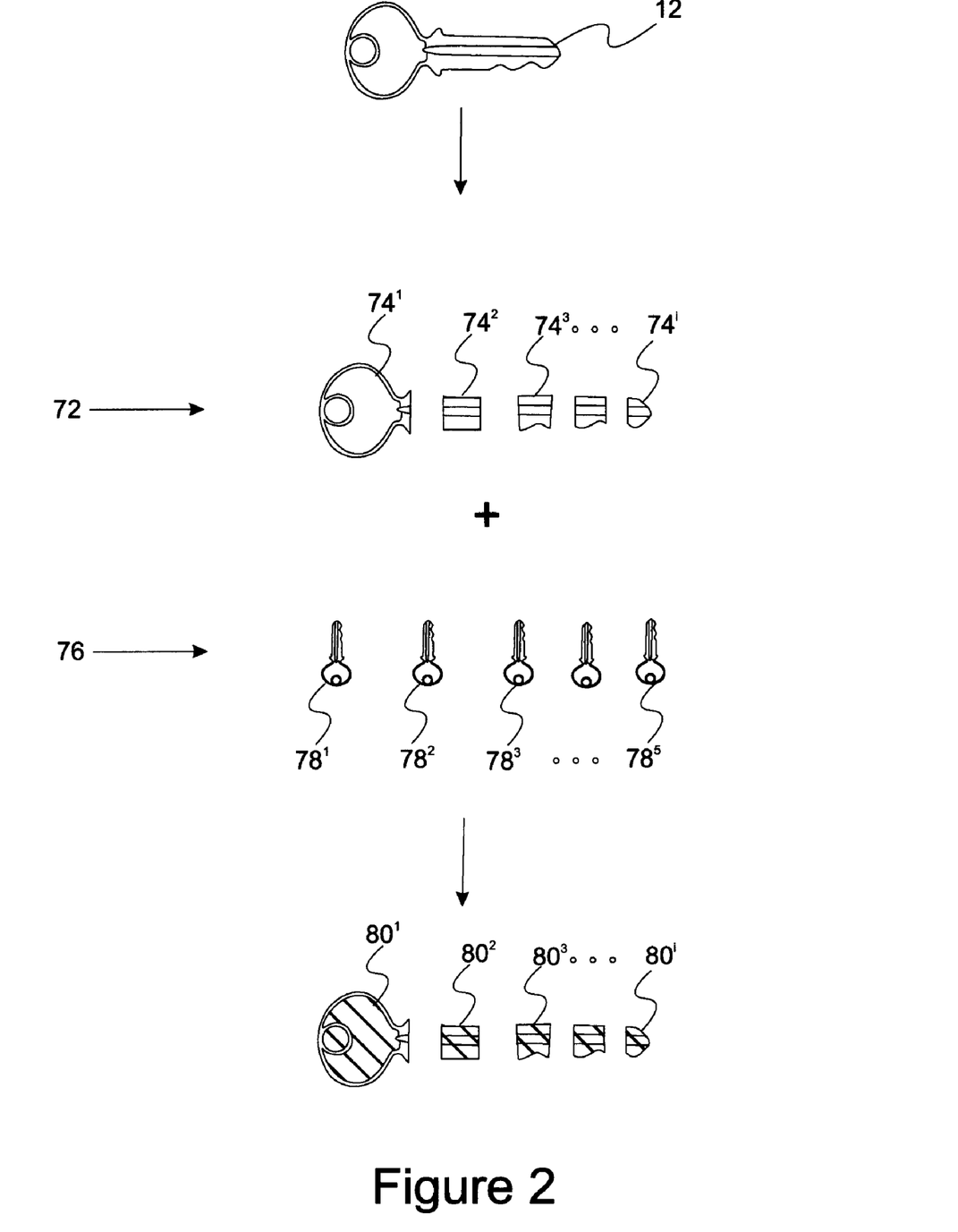
FIG. 2 provides a schematic flow chart showing the use of multiple ephemerizers in managing an encryption key.

With reference to FIG. 2, a schematic illustration of a variation using multiple ephemerizers to manage the encryption keys is provided. First encryption key 12 is partitioned into set 72 of key partitions 74$^i$. First encryption key 12 is reconstructable from a predetermined number of key partitions 74$^i$ which is equal to or less than the total number of key partitions 74$^i$. In this variation, encryption key 12 is not known to the ephemerizers. Key partitions 74$^i$ are encrypted with set 76 of ephemerizer encryption keys 78$^i$ to form encrypted key partitions 80$^i$. Each ephemerizer knows a decryption key to retrieve at least one of key partitions 74$^i$. In this variation, a quorum of ephemerizers are used to reconstruct first encryption key 12. Again, this quorum is a predetermined number of such ephemerizers that is equal to or less than the total number of key partitions 74$^i$.

Figure 1A:
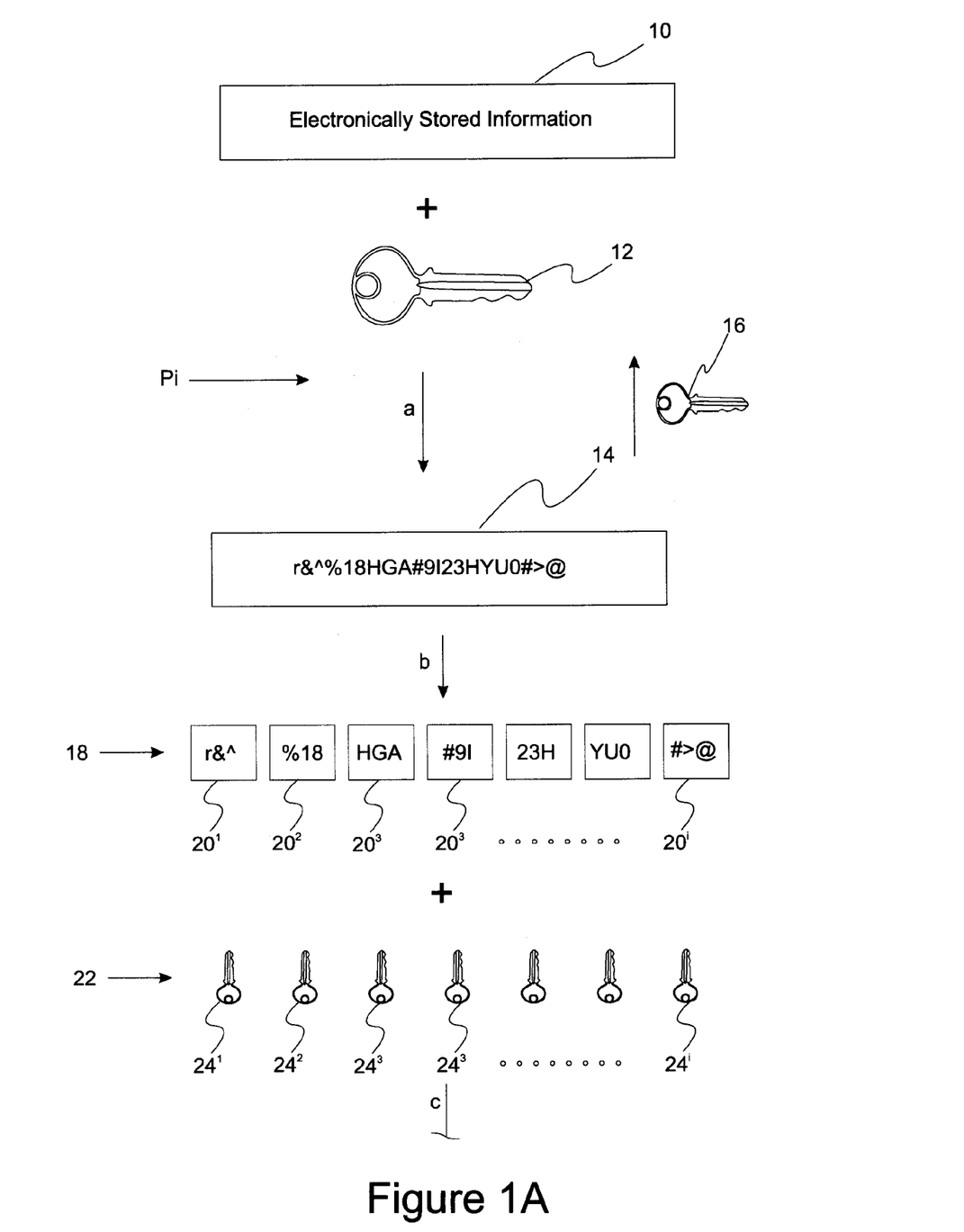
FIGS. 1A, 1B, 1C, and 1D provide a schematic illustration of the method of this embodiment.
Figure 1B:
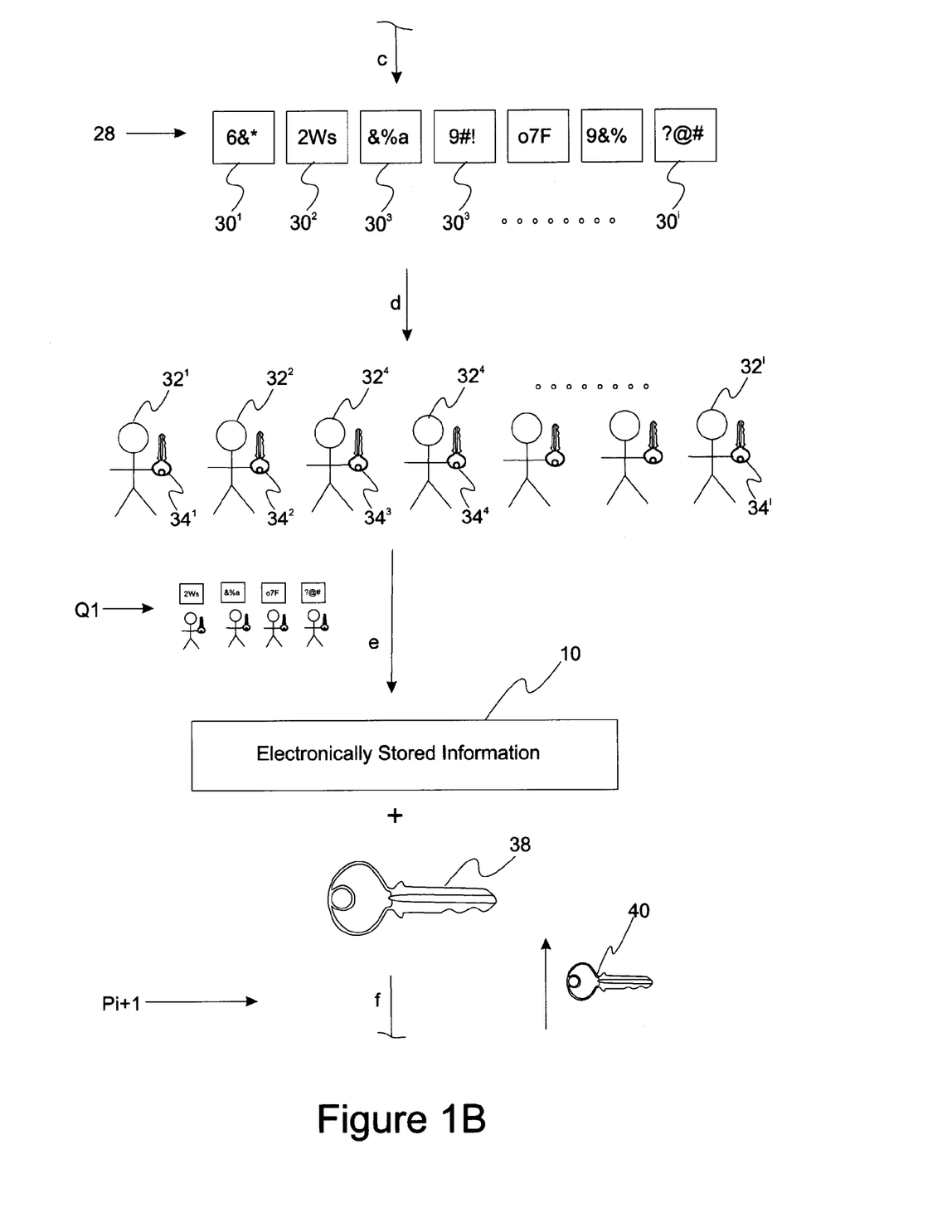
Figure 1C:
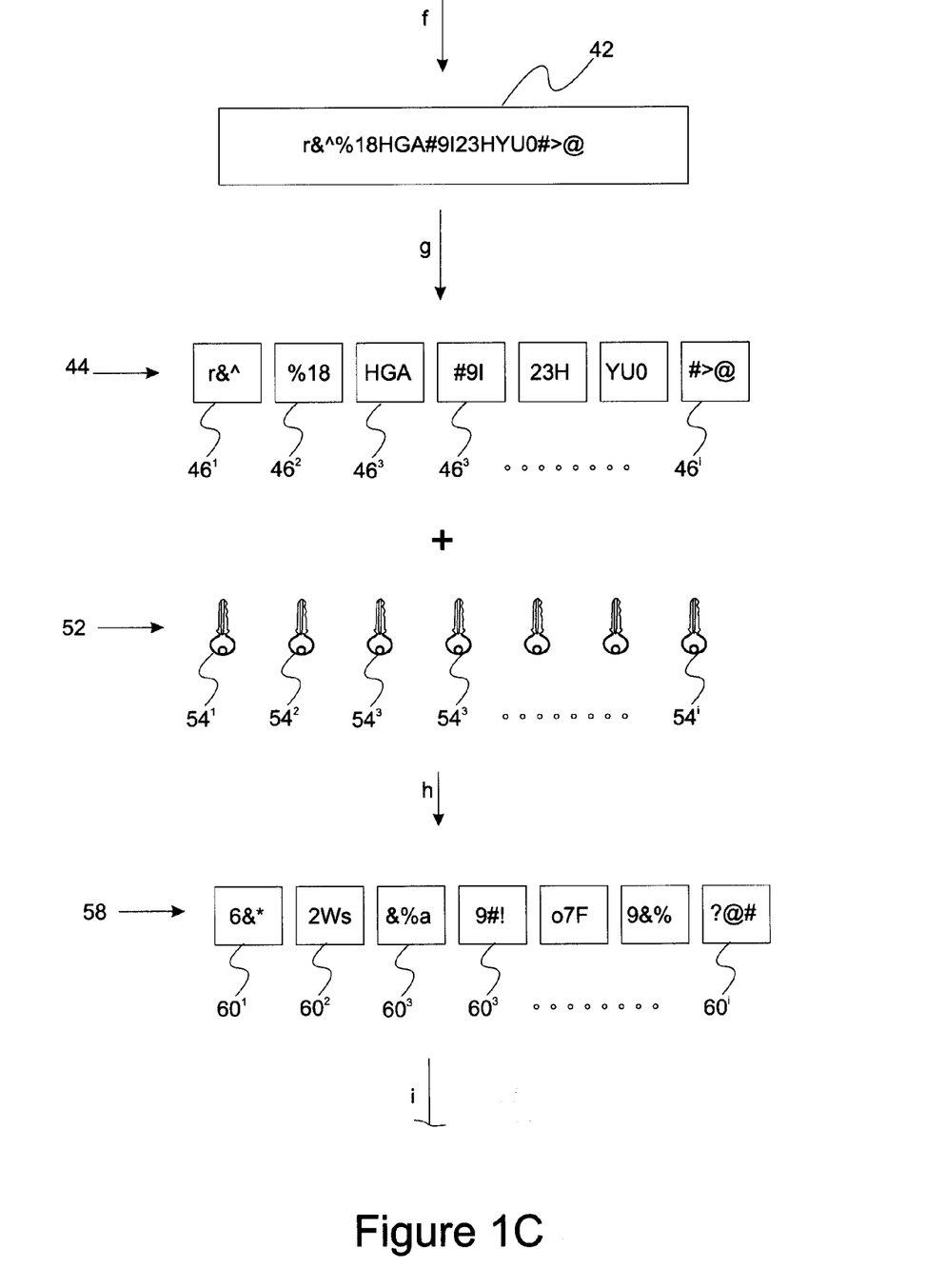
Figure 1D:
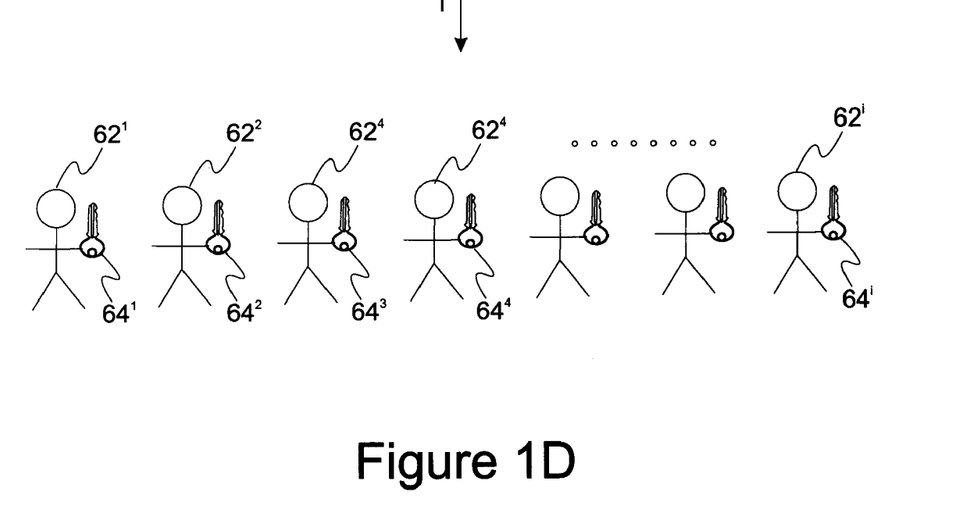
Figure 3:
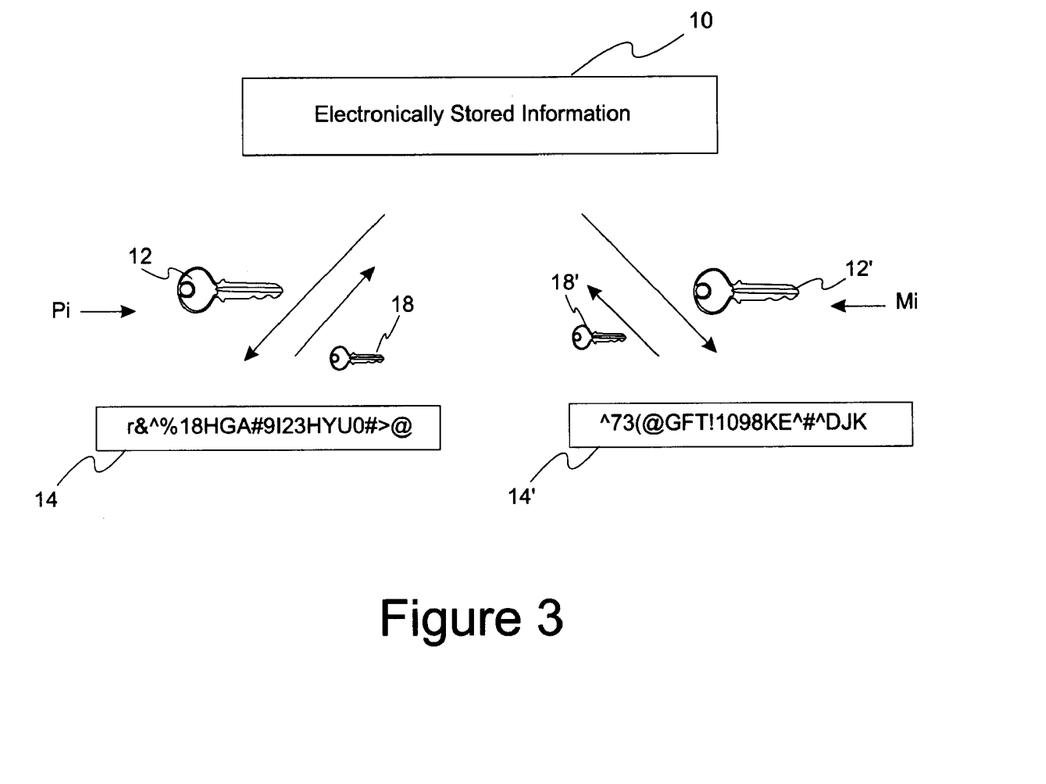
FIG. 3 provides a schematic flow chart showing the use of multiple ephemerizers managing multiple encryption keys.

In another refinement of the present embodiment, a plurality of ephemerizers manage first encryption key 12 and second encryption key 38 as set forth above in parallel. With reference to FIG. 3, a schematic illustration of this refinement using two ephemerizers is provided. Target electronically stored information 10 is encrypted by the first emphemerizer using public key pair Pi (which includes encryption key 12 and decryption key 16) to form encrypted ESI 14 and by the second ephemerizer using public key Mi (which includes encryption key 12' and decryption key 16') to form encrypted ESI 14'. In this scenario, each of encrypted ESI 14 and encrypted ESI 14' are broken into shares and encrypted as set forth above in FIG. 1 regarding steps b) and c).

Figure 4:
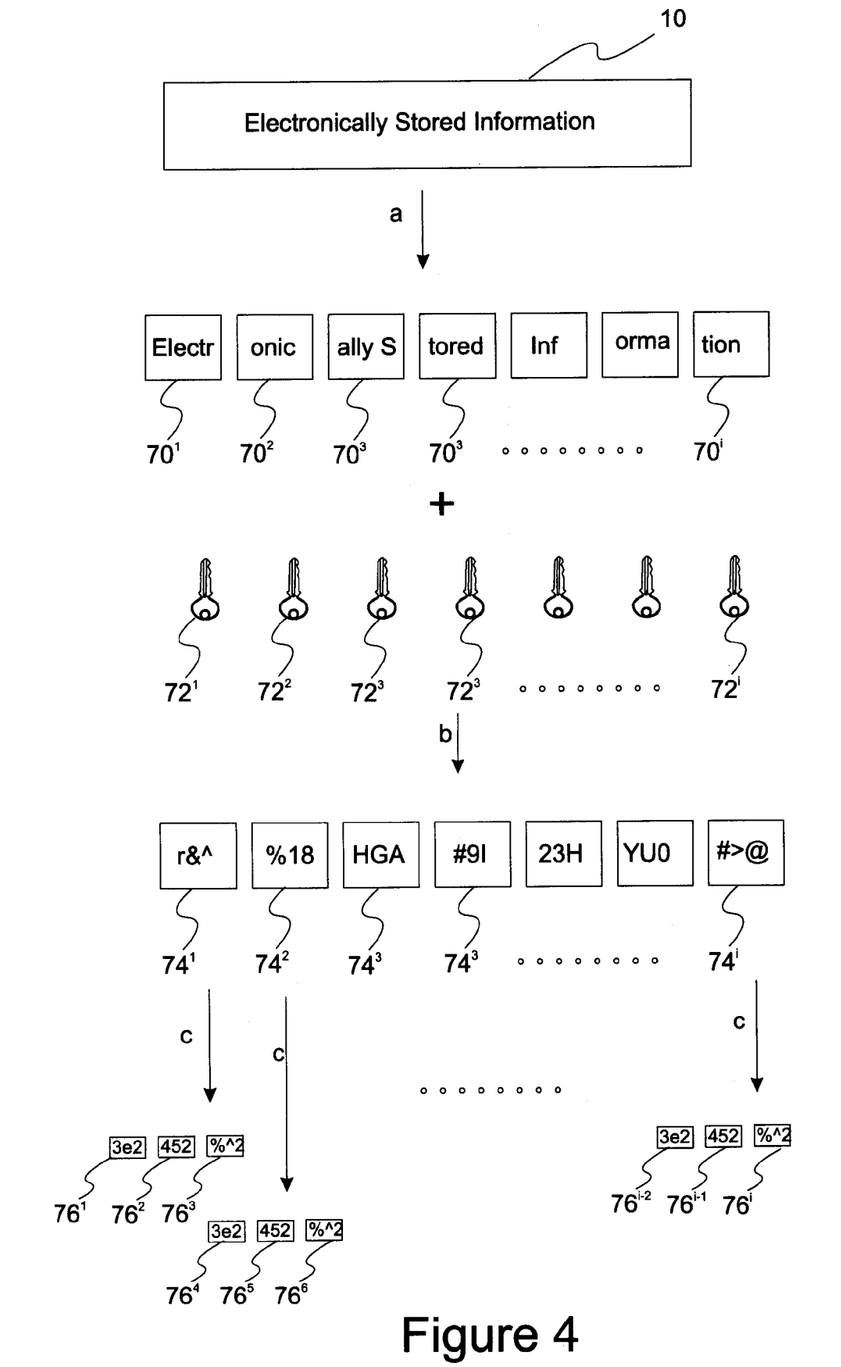
FIG. 4 provides a schematic flow chart of an alternative method for partitioning and encrypting target electronically stored information.

In another embodiment of the present invention, an alternative method for partitioning and encrypting target electronically stored information 10 is provided. FIG. 4 provides a schematic illustration of this variation. Target electronically stored information 10 is first divided in a plurality of ESI partitions 70$^i$. Each of ESI partitions 70$^i$ are encrypted with a different ephemerizer's public key pairs 72$^i$ to form encrypted partitions 74$^i$. Each of encrypted partitions 74$^i$ are further broken into user shares 76$^i$ to be retrievable by a quorum of users (e.g., system administrators) utilizing their respective decryption keys. When access privileges to target electronically stored information 10 is to be changed, the target electronically stored information 10 is retrieved by a quorum of users utilizing their decryption keys to retrieve shares 76$^i$. Shares 76$^i$ are then used to reconstruct ESI shares 70$^i$ which allows reconstruction of target electronically stored information 10. Steps a) though c) are then repeated with a second set of public keys.

Each of the keys and information used in the practice of the present invention may be stored on computer readable media. For example, one or more of first encryption key 12; decryption key 16; user encryption keys 24$^i$; decryption keys 34$^i$; second encryption key 38; decryption key 40; user encryption keys 54$^i$; decryption keys 64$^i$; ephemerizers keys 78$^i$; public key pair Pi; public key pair Pi+1; and public key pair Mi. Example of useful computer readable media include, but are not limited to, smart cards, removable hard drives, dongles, CDROM media, DVD media, and the like. In addition to utilizing an encoded key, each step requiring such a key may further require activation with another factor such as a personal identification number ("pin"), password, and/or biometric.

In an example of the invention involving system administrators, revocation of an administrator is effected as follows. Target electronically stored information 10 is retrieved by each of a quorum of system administrators retrieving his quorum share of first encrypted ESI 14. In a refinement, this is accomplished by a system administrator activating his smart card. The smart card is attached to a device that uses the smart card to decrypt the share of the target ESI. A quorum of system administrators decrypt their respective encrypted ESI partitions 20$^i$ in this manner. Encrypted ESI partitions 20$^i$ are combined to provide first encrypted ESI 14 which is encrypted with Pi (i.e., first encryption key 12). The system then requests that the ephemerizer decrypt using Pi (i.e., decryption key 16) in order for the system to obtain the target electronically stored information 10. To revoke a system administrator, target electronically stored information 10 is recovered by a quorum of the remaining system administrators. A new public key, Pi+1, is requested of the ephemerizer (though it still retains Pi). Target electronically stored information 10 is then re-encrypted with Pi+1 to form second encrypted ESI 42 as set forth above.

The present invention allows the security of target electronically stored information 10 to be maintained by ensuring that a system administrator not be allowed to participate in the quorum when his privileges have been revoked. This is true even if more than a quorum of system administrators have been revoked, and they have access to encrypted media, from which they could, at one point, target electronically stored information 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of storing electronic information, the method comprising:
    a) encrypting target electronically stored information ("ESI") with a first encryption key to form a first encrypted ESI;
    b) partitioning the first encrypted ESI into a first set of encrypted ESI partitions, the encrypted ESI partitions being such that a predetermined number of the encrypted ESI partitions are able to reconstruct the first encrypted ESI;
    c) encrypting the first set of encrypted ESI partitions with a first set of user encryption keys to form a first set of user-associated encrypted ESI partitions, each encrypted ESI partition of the first set of user-associated encrypted ESI partitions having an associated user encryption key;
    d) making available the first set of user-associated encrypted ESI partitions to a first set of users, wherein each user knows a decryption key for an encrypted ESI partition of the first set of user-associated encrypted ESI partitions;
    e) accessing the target electronically stored information;
    f) encrypting the target ESI with a second encryption key to form a second encrypted ESI;
    g) partitioning the second encrypted ESI into a second set of encrypted ESI partitions, the second set of encrypted ESI partitions being such that a predetermined number of encrypted ESI partitions from the second set are able to reconstruct the second encrypted ESI;
    h) encrypting the second set of encrypted ESI partitions with a second set of user encryption keys to form a second set of user-associated encrypted ESI partitions, each encrypted ESI partition of the second set of user-associated encrypted ESI partitions having an associated user encryption key, wherein the second set of user encryption keys is the same or different than the first set of encryption keys and wherein the first set of user encryption keys and the second set of user encryption keys each independently include a private portion of a public key pair;

i) making the second set of user-associated encrypted ESI partitions available to a second set of users, wherein each user of the second set of users knows a decryption key for an encrypted ESI partition of the second set of user-associated encrypted ESI partitions; and j) deleting the private portion of the first set of public key pairs after a predetermined time.

2. The method of claim 1 wherein the first encryption key is managed by an ephemerizer.

3. The method of claim 1 wherein the first encryption key and/or the second encryption key is broken into shares each of which is encrypted with an encryption key, the encryption key being associated with a corresponding decryption key known by each of a set of ephemerizers.

4. The method of claim 1 wherein there is a quorum of ephemerizers that can assist in retrieval of the first encryption key and/or the second encryption key without directly maintaining the first encryption key and/or the second encryption key.

5. The method of claim 2 wherein one or more of the first encryption key, the second encryption key, the first set of user encryption keys; the decryption key for an encrypted ESI partition of the first set of user-associated encrypted ESI partitions; the second set of user encryption keys; the decryption key for an encrypted ESI partition of the second set of user-associated encrypted ESI partitions; and multiple encryption keys managed by a different ephemerizer are encoded in a computer readable medium.

6. The method of claim 5 wherein the computer readable medium is a smart card or a dongle.

7. The method of claim 1 wherein the targeted electronically stored information comprises system administrator information.

8. The method of claim 7 wherein the targeted electronically stored information comprises an access key to an encrypted file system.

9. The method of claim 1 wherein the first set of users is a first set of system administrators and the second set of users is a second set of system administrators.

10. The method of claim 9 wherein one or more system administrators from the first set of system administrators are not members of the second set of system administrators.

11. The method of claim 1 wherein the target electronically stored information is retrievable from the first encrypted ESI with a decryption key which is a public portion of a public key pair.

12. The method of claim 1 wherein the private portion of a public key pair is provided by an ephemerizer.

13. The method of claim 1 wherein the predetermined number of encrypted ESI partitions is less than or equal to a total number of partitions encrypted ESI partitions.

* * * * *